(12) United States Patent
Tione et al.

(10) Patent No.: US 11,981,313 B2
(45) Date of Patent: May 14, 2024

(54) BRAKING SYSTEM FOR CARRYING OUT ADDITIONAL SAFE BRAKING FUNCTIONS

(71) Applicant: FAIVELEY TRANSPORT ITALIA S.P.A., Turin (IT)

(72) Inventors: Roberto Tione, Turin (IT); Paolo Pietro Piccione, Turin (IT)

(73) Assignee: FAIVELEY TRANSPORT ITALIA S.P.A., Turin (IT)

(*) Notice: Subject to any disclaimer, the term of this patent is extended or adjusted under 35 U.S.C. 154(b) by 226 days.

(21) Appl. No.: 17/756,410

(22) PCT Filed: Nov. 23, 2020

(86) PCT No.: PCT/IB2020/061021
§ 371 (c)(1),
(2) Date: May 24, 2022

(87) PCT Pub. No.: WO2021/105844
PCT Pub. Date: Jun. 3, 2021

(65) Prior Publication Data
US 2023/0001896 A1    Jan. 5, 2023

(30) Foreign Application Priority Data
Nov. 25, 2019   (IT) .................... 102019000022086

(51) Int. Cl.
*B60T 8/17* (2006.01)
*B60T 8/18* (2006.01)
*B60T 17/22* (2006.01)

(52) U.S. Cl.
CPC .......... *B60T 8/1705* (2013.01); *B60T 8/1893* (2013.01); *B60T 17/228* (2013.01); *B60Y 2400/81* (2013.01)

(58) Field of Classification Search
CPC ........................... B60T 8/1705; B60T 13/665
See application file for complete search history.

(56) References Cited

U.S. PATENT DOCUMENTS

| 9,283,945 | B1* | 3/2016 | Kernwein | ............. B60T 17/228 |
| 2002/0153765 | A1* | 10/2002 | Levy | ..................... B60T 13/665 303/6.1 |
| 2002/0163248 | A1 | 11/2002 | Wood et al. | |

(Continued)

FOREIGN PATENT DOCUMENTS

| EP | 3148853 B1 | 4/2018 |
| EP | 2830918 B1 | 5/2018 |

(Continued)

OTHER PUBLICATIONS

ISA European Patent Office, International Search Report Issued in Application No. PCT/IB2020/061021, Mar. 26, 2021, WIPO, 2 pages.

*Primary Examiner* — Long T Tran
(74) *Attorney, Agent, or Firm* — McCoy Russell LLP

(57) ABSTRACT

Various embodiments of a braking system for at least one bogie or railway vehicle comprising an emergency braking control unit made according to a first safety integrity level and a service braking control unit made according to a second safety integrity level lower than said first safety integrity level are described; the braking system carrying out at least one additional braking function at the same safety integrity level as the emergency braking control unit.

13 Claims, 7 Drawing Sheets

(56) References Cited

U.S. PATENT DOCUMENTS

| | | | |
|---|---|---|---|
| 2011/0029213 A1* | 2/2011 | Itano | B60T 13/665 |
| | | | 701/70 |
| 2012/0286563 A1* | 11/2012 | Lichterfeld | B60T 13/665 |
| | | | 303/15 |
| 2013/0134770 A1* | 5/2013 | Komoriya | B60T 15/027 |
| | | | 303/20 |
| 2015/0294049 A1* | 10/2015 | Kang | B60T 17/228 |
| | | | 703/2 |
| 2016/0221551 A1* | 8/2016 | Kim | B60T 8/1705 |
| 2017/0210399 A1* | 7/2017 | Leonard | B60T 13/665 |
| 2018/0170413 A1* | 6/2018 | Wright | B61L 15/0072 |
| 2020/0079343 A1* | 3/2020 | Martin | B60T 13/66 |
| 2020/0130659 A1* | 4/2020 | Grasso | B61H 13/20 |

FOREIGN PATENT DOCUMENTS

| | | | |
|---|---|---|---|
| WO | 2013144543 | A2 | 10/2013 |
| WO | 2018189693 | A1 | 10/2018 |
| WO | 2019207372 | A1 | 10/2019 |

\* cited by examiner

BRAKING SYSTEM FOR CARRYING OUT ADDITIONAL SAFE BRAKING FUNCTIONS

CROSS-REFERENCE TO RELATED APPLICATIONS

The present application is a U.S. National Phase of International Application No. PCT/IB2020/061021, entitled "BRAKING SYSTEM FOR CARRYING OUT ADDITIONAL SAFE BRAKING FUNCTIONS", and filed on Nov. 23, 2020. International Application No. PCT/IB2020/061021 claims priority to Italian Application No. 102019000022086, entitled "BRAKING SYSTEM FOR CARRYING OUT ADDITIONAL SAFE BRAKING FUNCTIONS", and filed on Nov. 25, 2019. The entire contents of the above-listed applications are hereby incorporated by reference for all purposes.

TECHNICAL FIELD

The present invention is generally placed in the field of railway braking systems; in particular, the invention refers to a braking system for a bogie or railway vehicle which allows for additional safe braking functions to be carried out.

PRIOR ART

The most recent railway braking systems use advanced electronic solutions in order to simplify the pneumatic architecture, especially the pneumatic portion used for emergency braking, resulting in an overall reduction of total product costs, reduction in weight, increase in performance and increase in operational safety.

FIG. 1 illustrates a known architecture of a new generation electro-pneumatic system 100.

An electro-pneumatic emergency braking unit 101 is supplied by a pneumatic supply pressure 102.

The electro-pneumatic emergency braking unit 101 is controlled, through closed-chain control algorithms, by an emergency braking control unit 103 by means of a plurality of control and feedback signals 105. The emergency braking control unit 103 is an electronic control unit.

The emergency braking control unit 103 receives at its input one or more weight signals 104 indicating the weight value that must be braked by the electro-pneumatic system 100. Said one or more weight signals 104 may be generated by pressure transducers adapted to measure the pressure generated by the suspension systems of the railway vehicle. Alternatively, said one or more weight signals 104 may be generated by linear or angular position transducers suitable to measure the distance of a bogie from the body of the railway vehicle. Obviously, this distance varies according to the weight of the body.

The emergency braking control unit 103 controls the electro-pneumatic emergency braking unit 101 to generate an emergency braking pressure 106, which is a function of the railway vehicle design parameters, such as, but not limited to, the maximum adhesion value envisaged between the wheel and the rail and the weight value to be braked derived from the weight signals 104.

The emergency braking pressure 106 supplies an electro-pneumatic service braking unit 107, allowing said electro-pneumatic service braking unit to generate in turn one or more service braking pressures 111, . . . , 114. There are four outputs shown in the figures, but the number of outputs could be different in other examples.

In embodiments known to those skilled in the art, the emergency braking pressure 106 may be supplied to the electro-pneumatic service braking unit 107 simultaneously with the pneumatic supply pressure 102.

In both cases just described, the current value of the emergency braking pressure 106 represents at all times the current maximum value that may be reached by the service braking pressures.

Real examples of both of the aforesaid cases will be provided hereinafter.

The electro-pneumatic service braking unit 107 is controlled, through closed-chain control algorithms, by a service braking control unit 108 by means of a plurality of control and feedback signals 109. The service braking control unit 108 is an additional electronic control unit.

The service braking control unit 108 receives a service braking request signal 110 indicating the need to perform a service braking, in the form of a pressure value request, or a braking force request, or a deceleration request. Furthermore, the service braking control unit 108 receives at its input one or more weight signals 104 indicating the weight value that must be braked by the system 100.

The service braking control unit 108 controls the electro-pneumatic service braking unit 107 to propagate one or more service braking pressures to the one or more outputs 111, . . . , 114 of the electro-pneumatic service braking unit 107. The one or more service braking pressures at the one or more outputs 111, . . . , 114 are a function of at least the service braking request 110 and the weight value to be braked derived from the weight signals 104. The one or more service braking pressures at one or more outputs 111, . . . , 114 of the electro-pneumatic service braking unit 107 are used to brake one or more axles of the railway vehicle.

The electro-pneumatic service braking unit 107 is designed to generate a maximum pneumatic service pressure value corresponding to the emergency pressure value 106.

Further, the electro-pneumatic service braking unit 107 is designed in such a way that, in the absence of control signals 109, it transfers the current emergency braking pressure value 106 to its outputs 111, . . . , 114.

An emergency braking request signal 115, indicating the need to carry out an emergency braking, acts on an interruption device 116. This interruption device 116 is, for example, but not exclusively, obtained by means of a multi-exchange relay, or a multiplicity of semiconductor switches. The interruption device 116 is designed in such a way as to maintain a closed contact configuration in the absence of an emergency braking request from the emergency braking request signal 115 and to maintain an open contact configuration in the presence of an indication of the need to perform an emergency braking from the emergency braking request signal 115.

In this way, in the absence of an indication of the need to carry out an emergency braking by the emergency braking request signal 115, the electro-pneumatic service braking unit 107 generates the one or more service braking pressures at the one or more outputs 111, . . . , 114 of the electro-pneumatic service braking unit 107 under the control of the service braking control unit 108.

The values of the one or more service braking pressures at the one or more outputs 111, . . . 114 of the electro-pneumatic service braking unit 107 have an upper limit of the current value of the emergency braking pressure 106. In the presence of an indication of the need to perform an emergency braking from the emergency braking request signal 115, the electro-pneumatic service unit 107 propagates the value of the emergency braking pressure 106 to the one or more outputs 111, . . . , 114 of the electro-pneumatic service braking unit 107.

A first example of a known braking system 100 is described in the patent EP3148853, shown in FIG. 2.

The EPDA unit of FIG. 2 corresponds to the electro-pneumatic emergency braking unit 101; the Weighting Control Unit of FIG. 2 corresponds to the emergency braking control unit 103.

The EPCA units of FIG. 2 each correspond to the electro-pneumatic service braking unit 107 and the outputs of said EPCA units towards brake cylinders BC1, . . . , BCN each correspond to a pressure at one or more outputs 111, . . . , 114 of the electro-pneumatic service braking unit 107.

The Braking Control Units of FIG. 2 each correspond to the service braking control unit 108; the output pressure to the relay valve 4 of FIG. 2 corresponds to the emergency braking pressure 106; the MBP pressure of FIG. 2 corresponds to the pneumatic supply pressure 102. The pressure at the output of the relay valve 4 of FIG. 2 supplies power to the solenoid valve group comprised of the solenoid valves 10, 12, 20 used to drive the relay valve RV. With respect to this architecture, it is evident to one skilled in the art how the pressure value at the brake cylinders BC1, . . . , BCn may never exceed the pressure value present at the output of the relay valve 4 of FIG. 2, corresponding to the emergency braking pressure 106 of the system 100.

A second example of an electro-pneumatic system 100 is described in the patent EP2830918, shown in FIG. 3.

The dashed box 401 corresponds to the electro-pneumatic emergency braking unit 101, the dashed box 402 corresponds to an electro-pneumatic service braking unit 107, and the pneumatic signal 403 corresponds to the emergency braking pressure 106.

In the present patent application reference will be made to the following European regulations:

EN50126 ["Railway applications. The specification and demonstration of reliability, availability, maintainability and safety (RAMS)];

EN50128 ["Railway applications. Communications, signalling and processing systems. Software for railway control and protection systems"];

EN50129 ["Railway applications. Communication, signalling and processing systems. Safety related electronic systems for signalling"].

In particular, the EN50126 standard defines the methodologies for assigning the safety integrity levels SIL0/1/2/3/4 (with safety level SIL4 indicating the maximum safety level) to the subsystems making up the system in question, based on the results of the Safety Analysis, and the EN50128 and EN50129 standards define the design criteria to be applied to the software and hardware components respectively on the basis of the SIL levels assigned based on said Safety Analysis results.

Factors known to those skilled in the art in the railway sector are:

that the safety calculations relating to the emergency braking function for a railway vehicle carried out in accordance with the European standard EN50126 systematically assign a Safety Integrity Level SIL≥3 to said emergency braking function, and consequently to the subsystems that implement them;

that the safety calculations relating to the service braking function for a railway vehicle carried out in accordance with the European standard EN50126 normally assign a Safety Integrity Level SIL≤2 to said service braking function, and consequently normally to the subsystems that implement them;

that the development of a control unit, typically with one or more microprocessors or based on one or more FPGAs, or according to mixed microprocessor and FPGA architectures, in accordance with SIL≥3 levels in relation to EN50128 and EN50129, entails design, validation and certification costs that are greater by about an order of magnitude when compared to design according to SIL≤2 levels, with the same functions obtained.

In relation to the last of the preceding points, it is clear that it is worthwhile to keep the functions to be developed according to the SIL≥3 safety levels extremely limited and simple.

It is therefore known in the prior art that the emergency braking control unit 103, being used for controlling the generation of the emergency braking pressure 106, must be developed according to an SIL safety level higher than the SIL safety level required for the development of the service braking control unit 108. Generally, the emergency braking control unit 103 is developed according to EN50128 and EN50129 SIL≥3, while the service braking control unit 108 is developed according to EN50128 and EN50129 SIL≤2.

The continuous and ever-increasing attention to the safety of railway systems for passenger trains has recently led to re-discussing the SIL safety integrity levels of some additional functions associated with the braking systems, said functions being currently developed according to SIL≤2 safety integrity levels.

A first function is known to those skilled in the art as the Holding Brake. This function consists in the automatic application of the braking force by the braking system when the speed of the train falls below a predetermined value, typically in the range between 1 km/h and 3 km/h.

This level of speed is reached when the railway vehicle is about to stop, for example at a platform for passengers to get on and off.

The object of the holding brake function is to prevent the vehicle from moving in either of the two possible directions due to inclination of the rail, while passengers are getting on and off.

In the normal mode of operation of the vehicle, the holding brake is maintained applied for at least the entire period wherein the doors of the railway vehicle remain open.

The holding brake is automatically removed from the braking system only when an appropriate safety signal indicates that the doors of the railway vehicle have closed and when a signal from the traction system indicates that traction torque sufficient to move the vehicle in the direction of travel has been applied by the traction motors.

This last measure is necessary to prevent the train from moving opposite to the direction of travel during the release of the holding brake in the event of an uphill slope. For this reason, in some cases, the holding brake function is also known as the anti-rollback function.

Currently the holding brake function is managed automatically by the service braking control unit 108, according to SIL≤2 safety levels.

In order to be able to carry out the holding brake function as previously described, the service braking control unit 108 receives one or more speed signals 200, coming for example but not exclusively from speed sensors, or from other modules generating a signal reference speed of the railway vehicle, not shown in the figure. By means of the rail vehicle speed information, the service brake control unit 108 determines the instant at which the holding brake function is to be activated. Further, the service braking control unit 108 receives one or more traction signals 201 generated by the traction systems. Such one or more traction signals 201 are indicative of the fact that the traction torque is or is not sufficient to prevent the defined rollback situation described above. Further, the service braking control unit 108 may receive one or more door status signals 202 from the vehicle door management system, indicating the open/closed status of the doors.

By observing said one or more traction signals 201 and one or more door status signals 202, the service braking control unit 108 determines the instant wherein the holding brake function is deactivated.

The service braking control unit 108 performs the holding brake function by driving the electro-pneumatic service braking unit 107, so as to obtain a holding braking pressure at the one or more outputs 111, . . . , 114 of the electro-pneumatic service braking unit 107.

This holding brake pressure is often determined by the service braking control unit 108, as a function of the one or more weight signals 104 indicative of the weight to be braked by the braking system 100.

Functional and operational analyses of the holding brake function have shown how a possible malfunction of the service braking control unit 108, typically an error caused by software, could for example release the holding brake while passengers are getting on/off the railway vehicle. Especially in cases wherein there is a space between the platform and the boarding/alighting plane of the train, a passenger could inadvertently place a foot into said space. If the railway vehicle were on a slope, given the preceding conditions, such a railway vehicle would have an undue movement which could cause serious physical injury to the passenger.

It is known to those skilled in the art that some railway operators require engine drivers to systematically activate the holding brake at each stop, regardless of the presence of the automatic holding brake function, to manually ensure that the railway vehicle does not have undue movements during the passenger boarding/alighting stage.

In other cases, the precaution of applying the emergency brake is entrusted only to the attention of the engine driver if the railway vehicle has undue movements while passengers are boarding/alighting due to the occurrence of a malfunction of the holding brake function.

The foregoing considerations lead to the consideration that a development of the holding brake function according to SIL≥3 levels would be adequate to mitigate the potential risks of serious injury to passengers, avoiding the systematic intervention of the engine driver at each stop.

A second function is known as "Distributor Emulation." This function emulates the functional behavior of a distributor valve through software functions. It is known that the distributor valve performs both the service braking function, which would require a development limited to an SIL≤2 safety level, and the emergency braking function, which requires development to an SIL≥3 safety level.

Currently the "Distributor Emulation" function is performed exclusively according to an SIL≤2 safety level by the service braking control unit 108.

In order to carry out the "Distributor Emulation" function, the service braking control unit 108 receives a pressure signal 202 indicative of the main brake pipe pressure. The pressure signal 202 is typically generated by a pressure transducer not shown in the figure and pneumatically connected to the main brake pipe.

The patent WO2018189693 describes the distributor emulation function and claims a possible realization of the "Distributor Emulation" function according to an architecture developed completely at an SIL≥3 level.

An additional high-safety braking function is envisaged by those skilled in the art: said function consists of a braking that may be modulated by the signaling system, such as ERTMS/ETCS, or by self-driving systems ATO (Automatic Train Operation) or further, by systems defined as Virtual Coupling of several trains.

Currently the linearly modulated braking is represented by Service Braking, the current safety level of which is assumed to be SIL2, which is not sufficient for the requirements of the autonomous driving systems mentioned above. At the same time the emergency braking function, despite being classified SIL4, acts in a binary on/off manner, which is not adequate for the functional requirements of the autonomous driving systems mentioned above.

It is known to those skilled in the art that the aforementioned self-driving systems will need to control the braking system in a linear manner with safety levels higher than the safety level of the current service braking. This means raising the service braking to SIL4 level, or making the emergency braking modulated.

As previously described, the complete implementation of complex functions, such as for example but not exclusively the "Holding Brake" function or the "Distributor Emulation" function or the "modulated braking by the signaling system" function according to an SIL≥3 safety level, is a source of substantial development, certification and maintenance costs.

SUMMARY OF INVENTION

An object of the present invention is therefore to propose a braking system for at least one bogie or railway vehicle, which allows the safety integrity level of any additional braking functions of the braking system to be increased, for example, but not exclusively, from SIL≤2 levels to SIL≥3 levels, limiting the complexity and overall development, certification and maintenance cost of the system, by making use of the existing units of said braking system.

The aforesaid and other objects and advantages are achieved, according to an aspect of the invention, by braking systems for a bogie or a railway vehicle, having the features defined in the respective independent claims. Preferred embodiments of the invention are defined in the dependent claims, the content of which is to be understood as an integral part of the present description.

BRIEF DESCRIPTION OF THE DRAWINGS

The functional and structural features of some preferred embodiments of an electronic control system for emergency and service braking according to the invention will now be described. Reference is made to the appended drawings, wherein.

DETAILED DESCRIPTION

Figure 1:
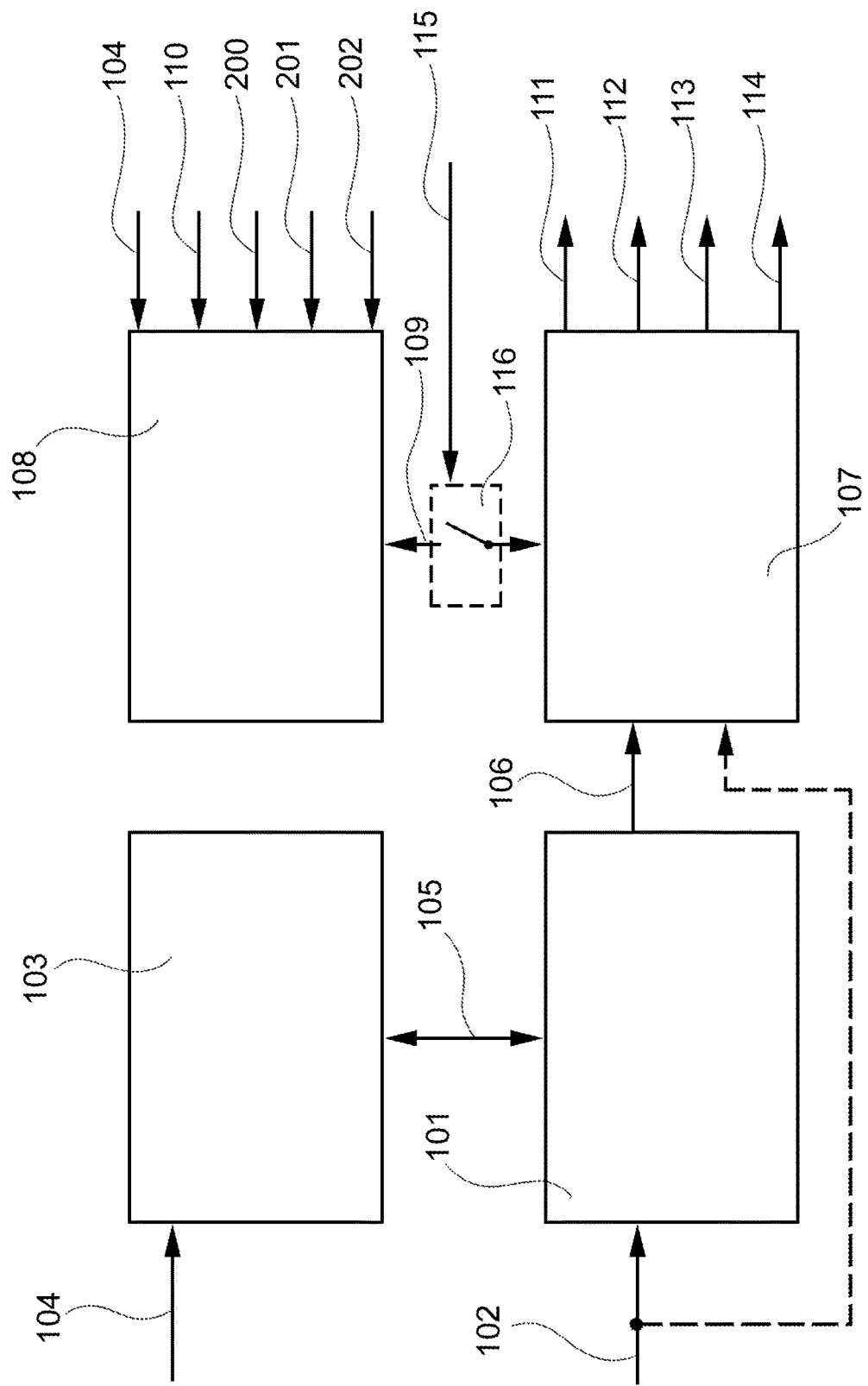
FIG. 1 shows a known architecture of a new generation electro-pneumatic braking system.
Figure 2:
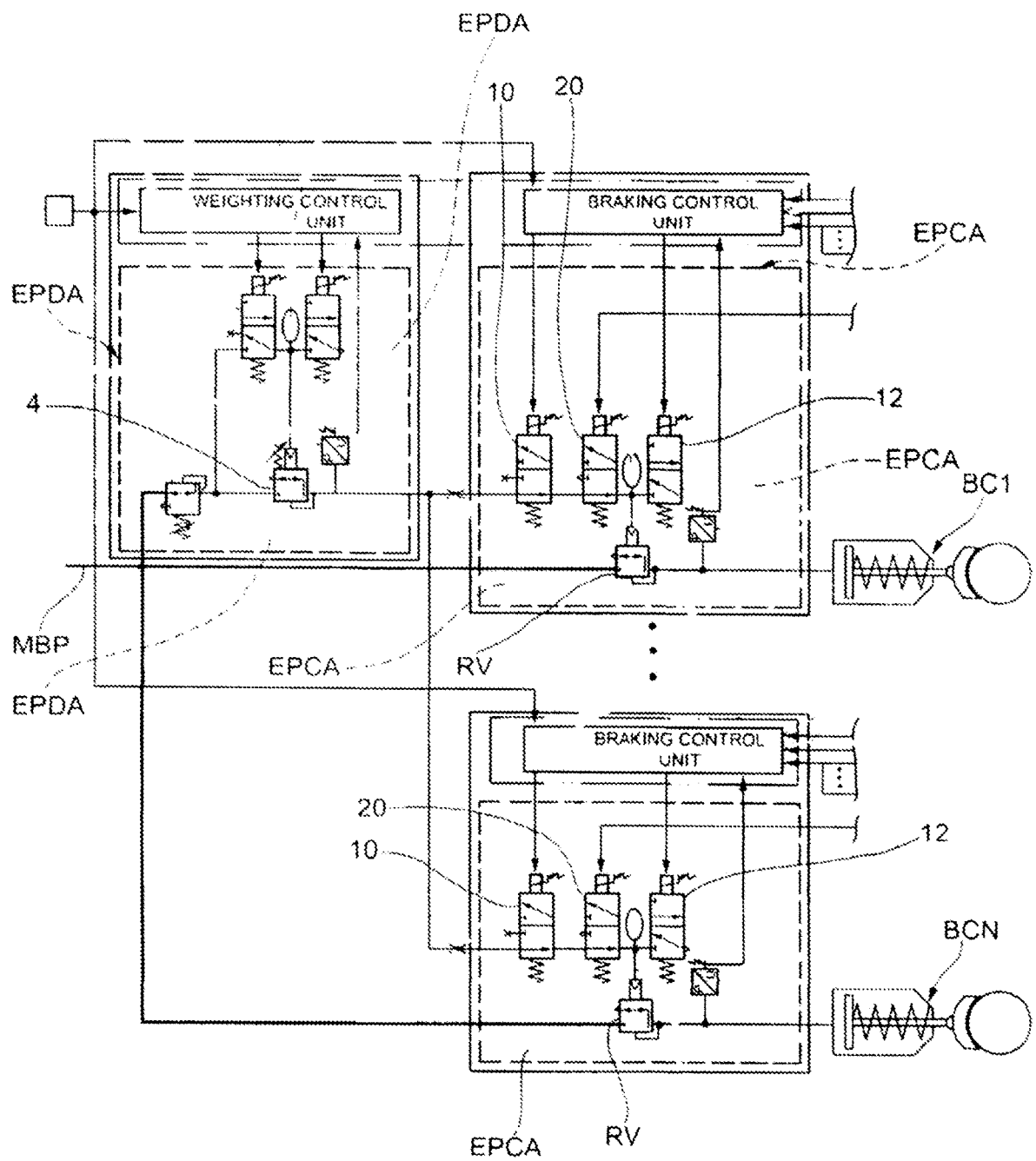
FIG. 2 shows a first example of a known braking system 100 of the patent EP3148853.
Figure 3:
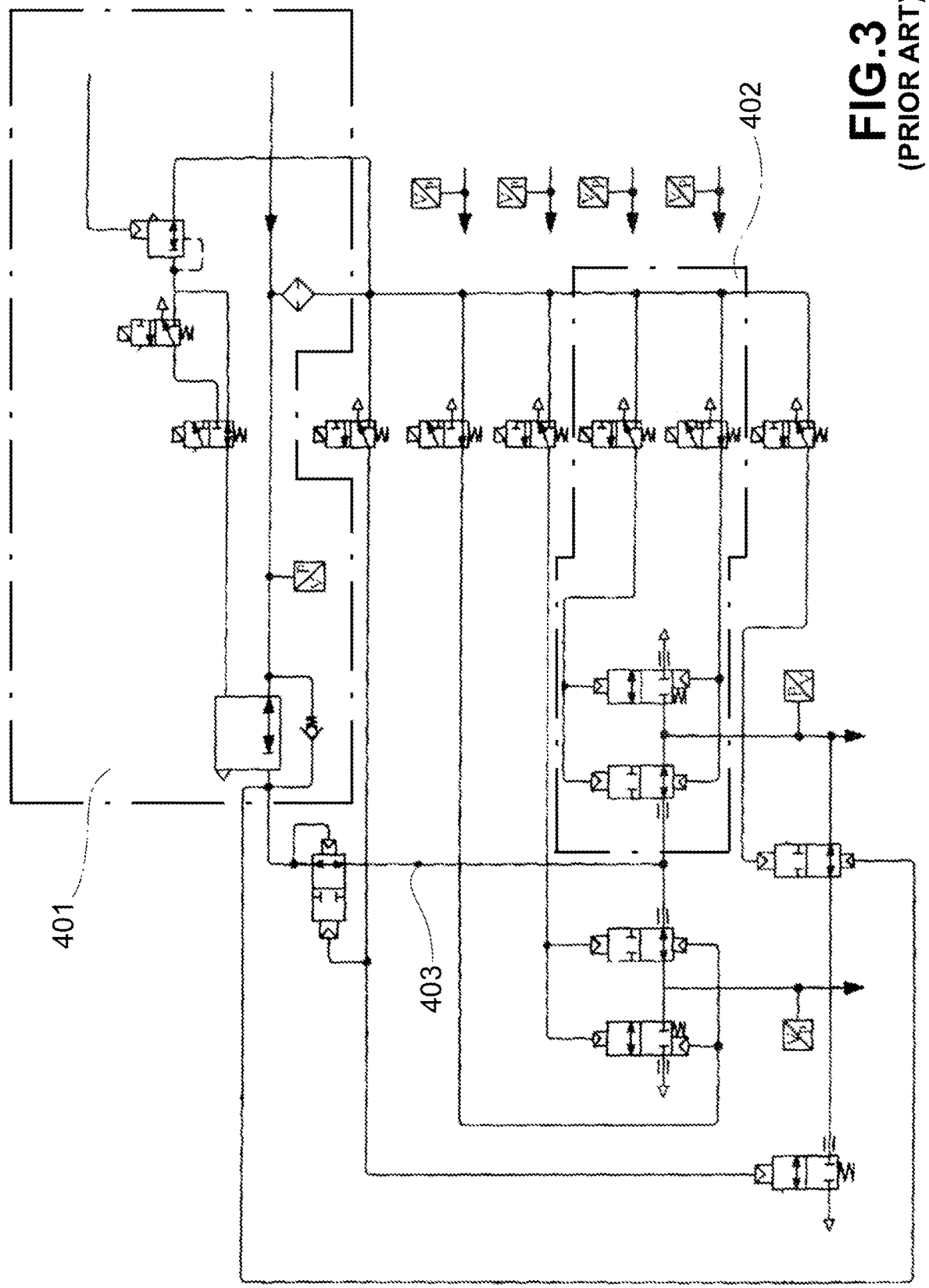
FIG. 3 shows a second example of a known braking system 100 of the patent EP2830918.

Before describing in detail a plurality of embodiments of the invention, it should be clarified that the invention is not limited in its application to the constructive details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and their variations are to be understood as encompassing the elements set out below and their equivalents, as well as additional elements and the equivalents thereof.

Figure 4:
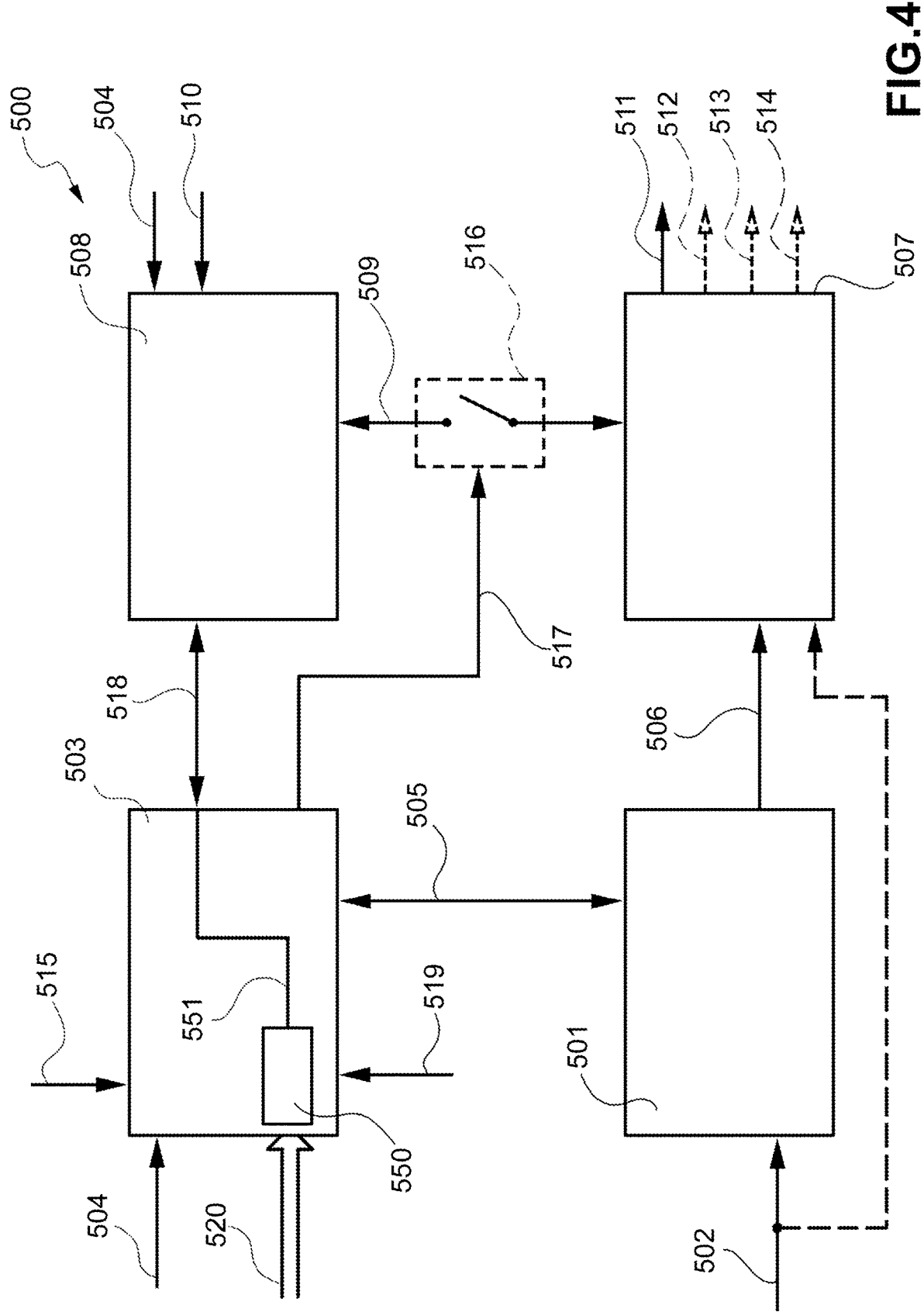
FIG. 4 shows a first embodiment of the braking system of the present invention.

FIG. 4 shows a first embodiment of a braking system 500 according to the invention.

The braking system 500 for at least one bogie or railway vehicle comprises an emergency braking control unit 503 made according to a first safety integrity level SIL and a service braking control unit 508 made according to a second safety integrity level SIL lower than said first safety integrity level SIL.

The emergency braking control unit 503 is arranged to control an electro-pneumatic emergency braking unit 501 by means of a first group of control and feedback signals 505, so as to generate through said electro-pneumatic emergency braking unit 501 an emergency braking system pressure 506 of which the pressure value is a function of at least one weight signal 504 indicative of the weight of the bogie or railway vehicle to be braked.

As may be seen in FIG. 4, the electro-pneumatic emergency braking unit 501 is arranged to be supplied by a pneumatic supply pressure 502.

The emergency braking control unit 503 is also arranged to determine at least one additional pressure value 551 associated with an additional braking function 550. The additional pressure value 551 is determined as a function of at least one input signal 520 associated with the additional braking function 550 which is received by the emergency braking control unit 503.

The term "determining" a value may be understood as either the act of calculating this value or the fact of taking this value from certain tables or databases.

The emergency braking control unit 503 is also arranged to transmit, by a communication means 518, the at least one additional pressure value 551 associated with the additional braking function 550 to the service braking control unit 508.

For example, but not exclusively, the communication means 518 may be a serial communication network.

The service braking control unit 508 is arranged to determine at least one service braking pressure value as a function of a service braking request signal 510 and the at least one weight signal 504, the service braking request signal 510 being indicative of a service braking request.

The service braking control unit 508 is further arranged to control an electro-pneumatic service braking unit 507, by means of a second group of control and feedback signals 509, so as to provide to the at least one output 511, ..., 514 of the electro-pneumatic service braking unit 507 the greater of the at least one additional pressure value 551 associated with the additional braking function 550 and the at least one service braking pressure value determined by the service braking control unit 508.

There are four outputs 511, ..., 514 of the electro-pneumatic service braking unit 507 shown by way of example in the figures, but the number of outputs could be different in other examples.

As may be observed in FIG. 4, the electro-pneumatic service braking unit 507 is arranged to receive at least the emergency braking pressure 506.

Returning now to describing the emergency braking control unit 503, it is further arranged to receive at least one feedback signal 519 indicative of the pressure value present at the at least one output 511, ..., 514 of the electro-pneumatic service braking unit 507.

Still further, the emergency braking control unit 503 is arranged to monitor, by means of the at least one feedback signal 519, the pressure value present at the at least one output 511, ..., 514 of the electro-pneumatic service braking unit 507, and to force a pressure value corresponding to the pressure value of the emergency braking pressure 506 to the at least one output 511, ..., 514 of the electro-pneumatic service braking unit 507, when the additional pressure value 551 associated with the additional braking function 550 is expected (in other words, should be present) at the at least one output 511, ..., 514 of the electro-pneumatic service braking unit 507, but the pressure value present at the at least one output 511, ..., 514 of the electro-pneumatic service braking unit 507 is lower by at least one predetermined tolerance value than the at least one additional pressure value 551 associated with said additional braking function 550, which has been determined by the emergency braking control unit 503.

In this way, the braking system 500 then carries out at least one additional braking function 550, whichever it may be, at the same safety integrity level as the emergency braking control unit 503.

Figure 5:
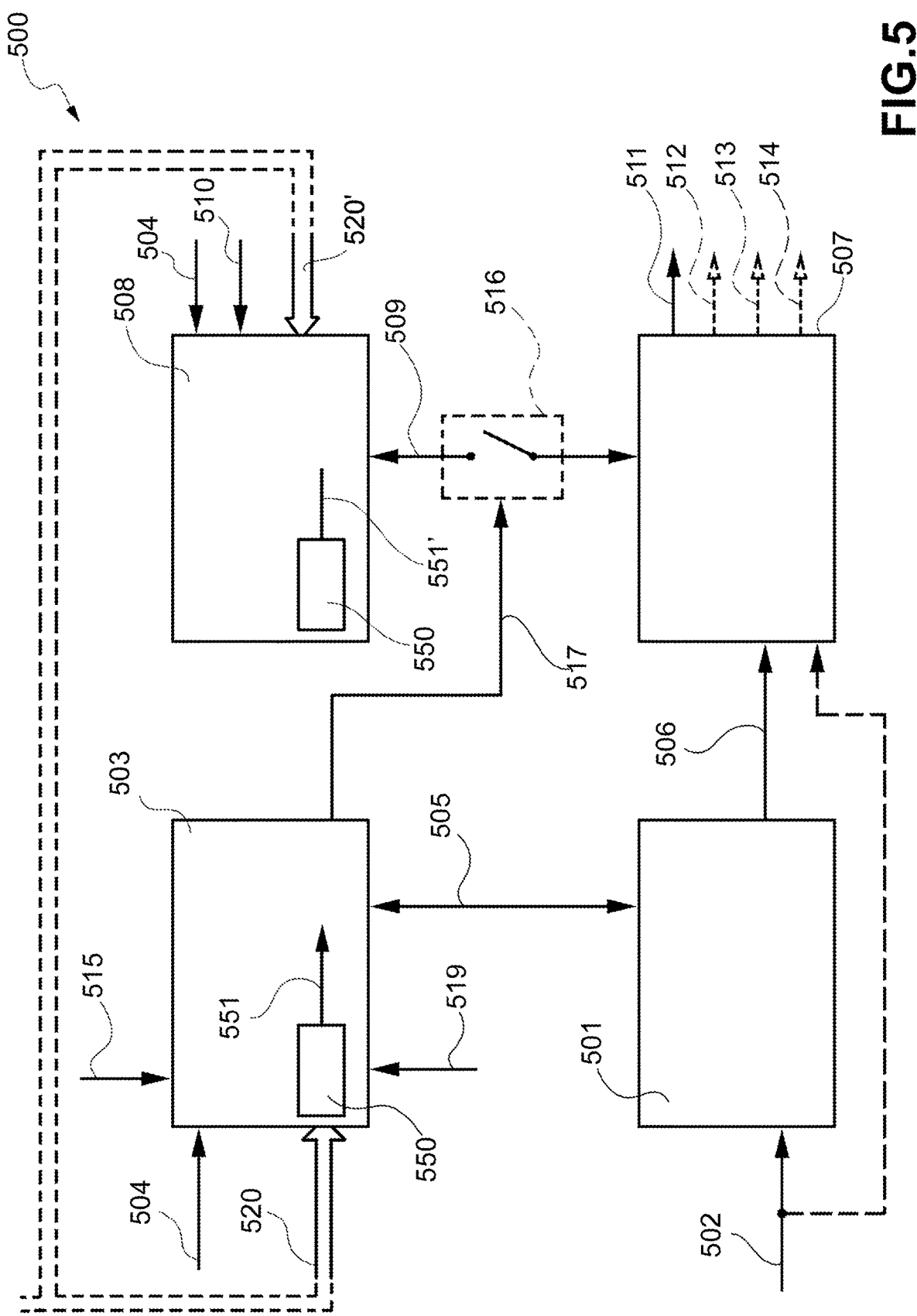
FIG. 5 shows a second embodiment of the braking system of the present invention.

Referring now to FIG. 5, in this figure a second embodiment of a braking system 500 according to the invention is shown.

The braking system 500 for at least one bogie or railway vehicle also in this case comprises the emergency braking control unit 503 made according to a first safety integrity level SIL and the service braking control unit 508 made according to a second safety integrity level SIL lower than said first safety integrity level SIL.

Also in this second embodiment, the emergency braking control unit 503 is arranged to control an electro-pneumatic emergency braking unit 501 by means of a first group of control and feedback signals 505. The emergency braking control unit 503 is arranged to control an electro-pneumatic emergency braking unit 501 so as to generate an emergency braking pressure 506 through said electro-pneumatic emergency braking unit 501. The pressure value of the emergency braking pressure 506 is a function of at least one weight signal 504 indicative of the weight of the bogie or railway vehicle to be braked. As may be seen in FIG. 5, the electro-pneumatic emergency braking unit 501 is arranged to be supplied by a pneumatic supply pressure 502;

The emergency braking control unit 503 is further arranged to determine at least a first additional pressure value 551 associated with an additional braking function 550. The first additional pressure value 551 is determined as a function of at least one input signal 520 associated with said additional braking function 550, which is received by the emergency braking control unit 503.

The service braking control unit is arranged to determine at least one service braking pressure value as a function of a service braking request signal 510 and of the at least one weight signal 504, and to determine at least one second additional pressure value 551' associated with the additional braking function 550, as a function of the at least one input signal 520' associated with said additional braking function 550, which is received by the service braking control unit 508.

The service braking control unit 508 is further arranged to control an electro-pneumatic service braking unit 507, by means of a second group of control and feedback signals 509, so as to provide to the at least one output 511, . . . , 514 of the electro-pneumatic service braking unit 507 the greater of the at least one second additional pressure value 551' associated with the additional braking function 550 and the at least one service braking pressure value determined by the service braking control unit 508. As may be observed in FIG. 5, the electro-pneumatic service braking unit 507 is arranged to receive at least the emergency braking pressure 506.

Returning now to describing the emergency braking control unit 503, in this second embodiment, it is also arranged to receive at least one feedback signal 519 indicative of the pressure value present at the at least one output 511, . . . , 514 of the electro-pneumatic service braking unit 507.

Further, the emergency braking control unit 503 is arranged to monitor, by means of the at least one feedback signal 519, the pressure value present at the at least one output 511, . . . , 514 of the electro-pneumatic service braking unit 507 and to force a pressure value corresponding to the pressure value of the emergency braking pressure 506 at the at least one output 511, . . . , 514 of the electro-pneumatic service braking unit 507 when at least one additional pressure value 551' determined by the service braking control unit 508 is expected at the at least one output 511, . . . , 514 of the electro-pneumatic service braking unit 507, but the pressure value present at the at least one output 511, . . . , 514 of the electro-pneumatic service braking unit 507 is lower by at least one predetermined tolerance value than the at least one additional first pressure value 551 associated with said additional braking function 550, which was determined by the emergency braking control unit 503.

Also in this second embodiment, the braking system 500 thus performs at least one additional braking function 550, whichever it may be, at the same safety integrity level as the emergency braking control unit 503.

Preferably, as regards both the first and second embodiments described above, the emergency braking control unit 503 may be arranged to control an interruption device 516 by means of a control signal 517.

The emergency braking control unit 503 in this case may be arranged to open the interruption device 516, so as not to allow the connection of the second group of control and feedback signals 509 between the service braking control unit 508 and the electro-pneumatic service braking unit 507 when the emergency braking control unit 503 must force a pressure value corresponding to the pressure value of the emergency braking pressure 506 to at least one output 511, . . . , 514 of the electro-pneumatic service braking unit 507. The electro-pneumatic service braking unit 507 may therefore be arranged to propagate the pressure value of the emergency pressure 506 to at least one output 511, . . . , 514 thereof, when the second group of control and feedback signals 509 are not connected between the service braking control unit 508 and the electro-pneumatic service braking unit 507.

Preferably, the emergency braking control unit 503 may be further arranged to receive an emergency braking request signal 515 indicative of an emergency braking request. The emergency braking control unit 503 will be able to cause the interruption device 516 to open by means of the control signal 517 when the emergency braking request signal 515 indicates an emergency braking request, regardless of the outcome of the comparison between the at least one feedback signal 519 and the pressure value present at the at least one output 511, . . . , 514 of the electro-pneumatic service braking unit 507. In other words, when the need for emergency braking is indicated, the emergency braking control unit 503 ensures that the emergency braking pressure 506 is propagated to the at least one output 511, . . . , 514 of the electro-pneumatic service braking unit 507.

Preferably, as regards both the first and second embodiments described above, when the emergency braking control unit 503 must force a pressure value corresponding to the pressure value of the emergency braking pressure 506 to the at least one output 511, . . . , 514 of the electro-pneumatic service braking unit 507, the emergency braking pressure 506 may be directly propagated to the at least one output 511, . . . , 514 of the electro-pneumatic service braking unit 507. Or, as may be seen in FIGS. 5 and 6, the electro-pneumatic service braking unit 507 may further be arranged to receive also the pneumatic supply pressure 502. In this case, when the emergency braking control unit 503 must force a pressure value corresponding to the pressure value of the emergency braking pressure 506 to the at least one output 511, . . . , 514 of the electro-pneumatic service braking unit 507, the pressure value of the supply pneumatic pressure 502 is limited to the value of the emergency braking pressure 506 within the electro-pneumatic service braking unit 507. The pneumatic supply pressure 502, of which the pressure value is limited to the value of the emergency braking pressure 506, is subsequently propagated to the at least one output 511, . . . , 514 of the electro-pneumatic service braking unit 507.

Figure 6:
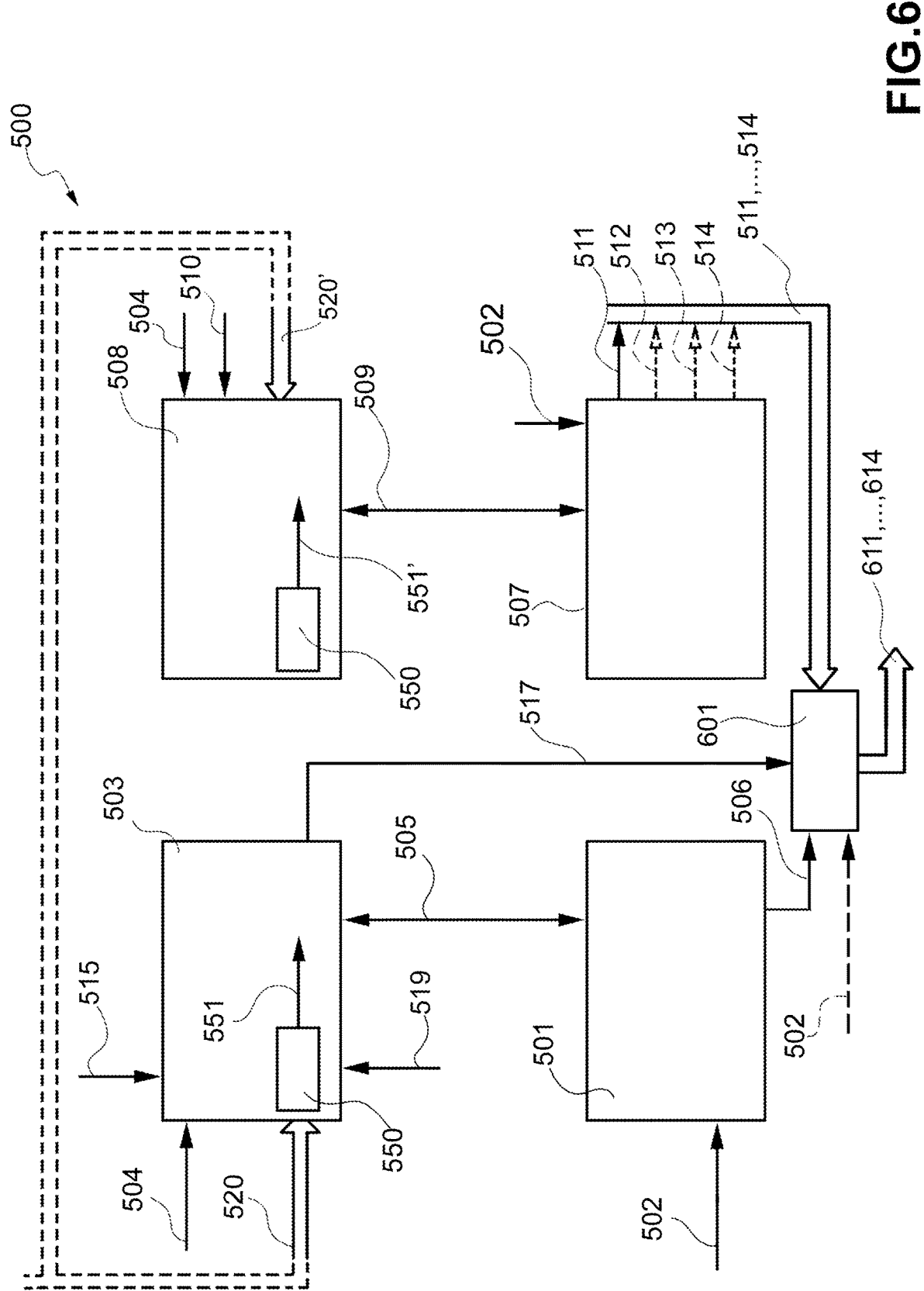
FIG. 6 shows a third embodiment of the braking system of the present invention.

Referring now to FIG. 6, in this figure a third embodiment of a braking system 500 according to the invention is shown.

In this third embodiment, the braking system 500 for at least one bogie or railway vehicle again comprises an emergency braking control unit 503 made according to a first safety integrity level SIL and a service braking control unit 508 made according to a second safety integrity level SIL lower than said first safety integrity level SIL.

In this third embodiment, the emergency braking control unit 503 is arranged to control an electro-pneumatic emergency braking unit 501 by means of a first group of control and feedback signals 505, so as to generate through said electro-pneumatic emergency braking unit 501 an emergency braking pressure 506 of which the pressure value is a function of at least one weight signal 504 indicative of the weight of the bogie or railway vehicle to be braked. The electro-pneumatic emergency braking unit 501 is arranged to be supplied by a pneumatic supply pressure 502.

The emergency braking control unit 503 is further arranged to determine at least one additional first pressure value 551 associated with an additional braking function 550, as a function of at least one input signal 520 associated with said additional braking function 550 which is received by the emergency braking control unit 503.

The service braking control unit 508 is arranged to determine at least one service braking pressure value as a function of a service braking request signal 510 and the at least one weight signal 504.

The service braking control unit 508 is arranged to determine at least a second additional pressure value 551' associated with the additional braking function 550, as a function of the at least one input signal 520' associated with said additional braking function 550 which is received by the service braking control unit 508.

Further, the service braking control unit 508 is arranged to control an electro-pneumatic service braking unit 507, by means of a second group of control and feedback signals 509, so as to provide to the at least one output 511, ..., 514 of the electro-pneumatic service braking unit 507 the greater of the at least one second additional pressure value 551' associated with the additional braking function 550, which has been determined by the service braking control unit 508, and the at least one service braking pressure value determined by the service braking control unit 508. As may be seen in FIG. 6, the electro-pneumatic service braking unit 507 is arranged to receive at least the pneumatic supply pressure 502.

In this third embodiment, the braking system 500 for at least one bogie or railway vehicle further comprises an electro-pneumatic selection unit 601 which includes at least one pressure output 611, ..., 614.

The electro-pneumatic selection unit 601 is arranged to receive at least the emergency braking pressure 506, the at least one pressure present at the at least one output 511, ..., 514 of the electro-pneumatic service braking unit 507 and a control signal 617 from the emergency braking control unit 503.

The electro-pneumatic selection unit 601 is further arranged to propagate to the at least one pressure output 611, ..., 614 of the electro-pneumatic selection unit 601 the emergency braking pressure 506 or the at least one pressure present at the at least one output 511, ..., 514 of the electro-pneumatic service braking unit 507, as a function of the control signal 617 from the emergency braking control unit 503.

The emergency braking control unit 503 is further arranged to receive at least one feedback signal 519 indicative of the pressure value present at the at least one pressure output 611, ..., 614 of the electro-pneumatic selection unit 601, and to monitor, by means of the at least one feedback signal 519, the pressure value present at the at least one pressure output 611, ..., 614 of the electro-pneumatic selection unit 601.

Further, the emergency braking control unit 503 is arranged to control the electro-pneumatic selection unit 601, through the control signal 617, so as to activate the propagation of the emergency pressure 506 to the at least one pressure output 611, ..., 614 of said electro-pneumatic selection unit 601 when the at least one second additional pressure value 551' determined by the service braking control unit 508 is expected at the at least one pressure output 611, ..., 614 of the electro-pneumatic selection unit 601, but the pressure value present at the at least one pressure output 611, ..., 614 of the electro-pneumatic selection unit 601 is lower by at least one predetermined tolerance value with respect to the at least one first additional pressure value 551 associated with said additional braking function 550 which has been determined by the emergency braking control unit 503.

Also in this third embodiment, the braking system 500 therefore carries out at least one additional braking function 550, whichever it may be, at the same safety integrity level as the emergency braking control unit 503.

Figure 7:
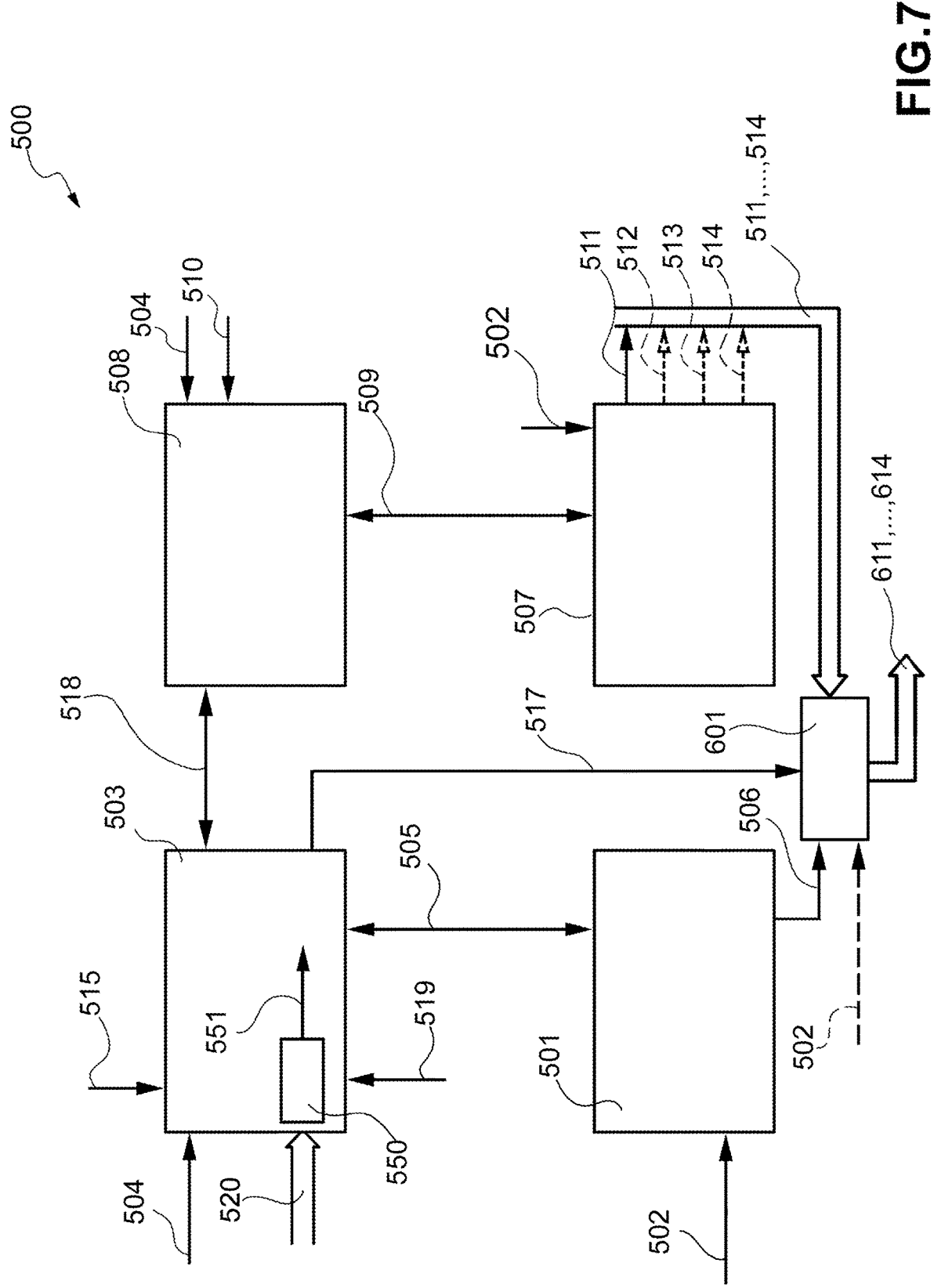
FIG. 7 shows a fourth embodiment of the braking system of the present invention.

Referring now to FIG. 7, in this figure a fourth embodiment of a braking system 500 according to the invention is shown.

Also in this case, the braking system 500 for at least one bogie or railway vehicle comprises an emergency braking control unit 503 made according to a first safety integrity level and a service braking control unit 508 made according to a second security integrity level lower than said first security integrity level.

The emergency braking control unit 503 is arranged to control an electro-pneumatic emergency braking unit 501 by means of a first group of control and feedback signals 505, so as to generate an emergency braking pressure 506 through said electro-pneumatic emergency braking unit 501 of which the pressure value is a function of at least one weight signal 504 indicative of the weight of the bogie or railway vehicle to be braked. The electro-pneumatic emergency braking unit 501 is arranged to be supplied by a pneumatic supply pressure 502.

The emergency braking control unit 503 is further arranged to determine at least one additional pressure value 551 associated with an additional braking function 550, as a function of at least one input signal 520 associated with said additional braking function 550 and received by the emergency braking control unit 503.

Further, the emergency braking control unit 503 is arranged to transmit, through a communication means 518, the at least one additional pressure value 551 associated with the additional braking function 550 to the service braking control unit 508.

The service braking control unit 508 is arranged to determine at least one service braking pressure value as a function of a service braking request signal 510 and the at least one weight signal 504. Further, the service braking control unit 508 is arranged to control an electro-pneumatic service braking unit 507, by means of a second group of control and feedback signals 509, so as to provide to the at least one output 511, ..., 514 of the electro-pneumatic service braking unit 507 the greater of the at least one additional pressure value 551 associated with the additional braking function 550 which has been determined by the emergency braking control unit 503 and the at least one service braking pressure value determined by the service braking control unit 508. The electro-pneumatic service braking unit 507 is also arranged to receive at least the pneumatic supply pressure 502.

As for the third embodiment described above, also in this fourth embodiment, the braking system 500 for at least one bogie or railway vehicle comprises an electro-pneumatic selection unit 601 including at least one pressure output 611, ..., 614. The electro-pneumatic selection unit 601 is again arranged to receive at least the emergency braking pressure 506, the at least one pressure present at the at least one output 511, ..., 514 of the electro-pneumatic service braking unit 507 and a control signal 617 coming from the emergency braking control unit 503, and is further arranged to propagate to at least one pressure output 611, ..., 614 thereof the emergency braking pressure 506 or the at least one pressure present at the at least one output 511, ..., 514 of the electro-pneumatic service braking unit 507, according to the control signal 617 coming from the emergency braking control unit 503.

In this fourth embodiment, the emergency braking control unit 503 is further arranged to receive at least one feedback signal (519) indicative of the pressure value present at the at least one pressure output 611, ..., 614 of the electro-pneumatic selection unit 601, to monitor, by means of the at least one feedback signal 519, the pressure value present at the at least one pressure output 611, . . . , 614 of the electro-pneumatic selection unit 601, and to control the electro-pneumatic selection unit 601 through the control signal 617 so as to activate the propagation of the pressure value of the emergency braking pressure 506 to the at least one pressure output 611, . . . , 614 of said electro-pneumatic selection unit 601 when the at least one additional pressure value 551 is expected at at least one pressure output 611, . . . , 614 of the electro-pneumatic selection unit 601, but the pressure value present at the at least one pressure output 611, . . . , 614 of the electro-pneumatic selection unit 601 is lower by at least one predetermined tolerance value than the at least one additional pressure value 551 associated with said additional braking function 550 which has been determined by the emergency braking control unit 503.

Also in this case the braking system 500 thus carries out at least one additional braking function 550 at the same safety integrity level as the emergency braking control unit 503.

The electro-pneumatic selection unit 601 may be made, for example, as a simple electro-pneumatic multi-way valve, or it may be a more complex device where the emergency braking pressure 506 and the at least one pressure at the at least one output 511, . . . , 514 of the electro-pneumatic service unit 507 are selected to comprise driving pressures for a pneumatic amplification device supplied by the pneumatic supply pressure 502.

Preferably, the emergency braking control unit 503 may be further arranged to receive an emergency braking request signal 515 indicative of an emergency braking request. The emergency braking control unit 503, through the control signal 617, will be able to activate the propagation of the emergency pressure 506 to the at least one pressure output 611, . . . , 614 of said electro-pneumatic selection unit 601 when the emergency braking request 515 indicates the presence of an emergency braking request. In other words, when the need for emergency braking is indicated, the emergency braking control unit 503 ensures that the emergency braking pressure 506 is propagated to the at least one pressure output 611, . . . , 614 of the electro-pneumatic selection unit 601.

Preferably, as regards any previously described embodiment, the additional braking function 550 may be a holding brake function and the at least one input signal 520, 520' associated with said additional braking function 550, which is received by only the emergency braking control unit 503 or which is received by both the emergency braking control unit 503 and the service braking control unit 508, may comprise at least one speed signal 200 indicative of the speed of at least one axle of the bogie or railway vehicle, or directly indicative of a travel speed of said bogie or railway vehicle, and at least one available traction torque signal 201 indicative of the traction torque currently present. The at least one input signal 520, 520' associated with said additional braking function 550, which is received by only the emergency braking control unit 503 or is received by both the emergency braking control unit 503 and by the service braking control unit 508, may further comprise one or more door status signals 202 from the vehicle door management system, indicating the open/closed status of the doors.

Preferably, as regards any previously described embodiment, the additional braking function 550 may be a Distributor Emulation function and the at least one input signal 520,520' associated with said additional braking function 550, which is received by only the emergency braking control unit 503 or which is received by both the emergency braking control unit 503 and the service braking control unit 508, may correspond to a signal indicative of a main brake pipe pressure 202 of the bogie or railway vehicle.

In a further aspect, the emergency braking control unit 503 may be arranged to determine the at least one additional first pressure value 551 associated with the additional braking function 550 by picking from a single- or multi-dimensional matrix indexed with discretized values relating to the at least one input signal 520 associated with said additional function 550, which is received by the emergency braking control unit 503. Alternatively or additionally, the service braking control unit 508 may be arranged to determine the at least one second additional pressure value 551' associated with the additional braking function 550 by picking from a single- or multi-dimensional matrix indexed with discretized values relating to the at least one input signal 520' associated with said additional function 550 which is received by the service braking control unit 508.

The matrix may be determined beforehand and subsequently loaded into a non-volatile memory of said braking system 500.

An example will now be described, referring to the first embodiment described previously, wherein the additional braking function 550 of which the safety level is to be raised is a holding brake function.

The at least one input signal 520 associated with the additional braking function 550, which is received by the emergency braking control unit 503, comprises one or more speed signals, coming for example but not exclusively from speed sensors, or from other modules generating a reference speed signal of the train or railway vehicle, and one or more traction signals generated by the traction computers. The one or more traction signals are arranged to indicate that the traction torque is or is not sufficient to prevent a defined rollback situation. Furthermore, the at least one input signal 520 associated with the additional braking function 550, which is received by the emergency braking control unit 503, may include one or more signals from the vehicle door management system, indicating the doors' open/closed status.

The communication means 518, for example but not exclusively a serial communication network, allows the emergency braking control unit 503 to communicate with the service braking control unit 508.

As regards the holding brake function, considering the first embodiment described previously, the emergency braking control unit 503, in addition to performing the actions relating to the generation of the emergency braking pressure 506 described previously, observes the one or more speed signals to determine if the train speed has reached the value for which the braking system 500 must apply the holding brake pressure to the outputs 511, . . . 514 of the electro-pneumatic service unit 507. When the emergency braking control unit 503 determines that the speed of the train has reached the value for which the braking system 500 must apply the holding brake pressure 551, the emergency braking control unit 503 determines the holding brake pressure value 551 to be applied, for example but not exclusively as a function of the weight value 504 to be braked, and sends a command to the service braking control unit 508, through the communication means 518, to apply to the outputs 511, . . . , 514 of the electro-pneumatic service braking unit 507 said holding braking pressure value 551.

Subsequently, through the one or more feedback signals 519, the emergency braking control unit 503 checks that the pressure values at one or more outputs 511, . . . , 514 of the electro-pneumatic service braking unit 507 coincide with the holding brake pressure value 551 previously determined by the emergency braking control unit 503, within a predetermined tolerance band. If the read pressure value of at least one feedback signal 519 does not coincide with the previously determined holding brake pressure value 551, within said predetermined tolerance band, the emergency braking control unit 503 commands the contacts of the interruption device 5116 to open by means of the control signal 517. In this way, the electro-pneumatic service braking unit 507 will propagate the value of the emergency braking pressure 506 to the at least one output 511, . . . , 514 of the electro-pneumatic service braking unit 507.

If, on the other hand, the holding brake is successful, when one or more traction signals indicate the presence of sufficient traction torque to avoid the rollback effect, or rather they indicate that all the doors of the vehicle/train are closed, the emergency braking control unit 503 sends the command to restore normal service braking management to the service braking control unit 518 by the communication means 518.

In a further example, relating to the holding brake function and referring to the second embodiment described above, that which has been stated for the at least one input signal 520 associated with the additional braking function 550, which is received by the emergency braking control unit 503, is also valid for this further example. In this further example, however, the one or more speed signals and the one or more traction signals are the at least one input signal 520' associated with the additional braking function 550, which is received by the service braking control unit 508. Further, the at least one input signal 520' associated with the additional braking function 550, which is received by the service braking control unit 508, may include one or more signals from the vehicle door management system, indicating the open/closed status of the doors.

In this second example, the emergency braking control unit 503, in addition to performing the actions related to generating the emergency braking pressure 506 described above, observes the one or more speed signals to determine if the speed of the train has reached the value for which the braking system 500 must apply the holding brake pressure 551. When the emergency braking control unit 503 determines that the speed of the train or railway vehicle has reached the value for which the braking system 500 must apply the holding brake pressure 551, the emergency braking control unit 503 determines the holding brake pressure value 551 to be applied, for example but not exclusively as a function of the weight value 504 to be braked.

At the same time, the service braking control unit 508, in addition to carrying out the actions relating to generating the service braking pressure at the outputs 511, . . . , 514, of the electro-pneumatic service braking unit 507, observes one or more speed signals to determine if the speed of the train or railway vehicle has reached the value for which the braking system 500 must apply the holding brake pressure 551. When the service braking control unit 508 determines that the speed of the train or railway vehicle has reached the value for which the braking system 500 must apply the service braking pressure 551, it determines the holding brake pressure value 551 to be applied, for example but not exclusively according to the weight value 504 to be braked, and controls the electro-pneumatic service braking unit 507 so as to generate a pressure at the outputs 511, . . . , 514 of the electro-pneumatic service braking 507 corresponding to the holding brake pressure value determined by the service braking control unit 508.

Subsequently, the emergency braking control unit 503, through the one or more feedback signals 519, checks that the pressure values at one or more service braking outputs 511, . . . , 514 of the electro-pneumatic service braking unit 507 coincide with the holding brake pressure value 551 previously determined by the emergency braking control unit 503, within a predetermined tolerance band. If the pressure value read by one or more feedback signals 519 does not coincide with the holding brake pressure value 551 previously determined by the emergency braking control unit 503, within said predetermined tolerance band, the emergency braking control unit 503, commands the contacts of the interruption device 516 to open by means of the control signal 517. In this way, the electro-pneumatic service braking unit 507 will propagate the value of the emergency braking pressure 506 to the outputs 511, . . . , 514 of the electro-pneumatic service braking unit 507.

If, on the other hand, the holding brake is successful, when one or more traction signals indicate the presence of sufficient traction torque to avoid the rollback effect and/or all the doors of the vehicle/train are closed, the service braking control unit 508 restores the management of service braking, and the emergency braking control unit 503 considers the holding brake monitoring procedure to be positively concluded.

In the two examples relating to the holding brake function illustrated above, the control, monitoring and possible replacement actions carried out by the emergency braking control unit 503 as regards the service braking control unit 508 ensure that, for any failure that has occurred in the service control unit 508, in relation to carrying out the holding brake function, a braking pressure equal to or greater than that requested by the holding brake function is always and in any case applied to the outputs 511, . . . , 514 of the electro-pneumatic service braking unit 507 according to a safety level equal to that assigned to the emergency braking control unit 503, thus raising the holding brake function to a safety level equal to that assigned to the emergency braking control unit 503.

An example will now be described, referring to the second embodiment described above, wherein the additional brake function 550 of which the safety level is to be raised is a distributor valve emulation function.

It is known to those skilled in the art that the distributor valve performs two functions, as a function of the main brake pipe pressure:

When the main brake pipe pressure falls within values between nominal 5 bar and nominal 3.5 bar, it is intended to act in a functional area that may be defined as service braking;

When the main brake pipe pressure falls below the nominal 3.5 bar value, it is intended to act in a functional area that may be defined as emergency braking.

Starting from these assumptions, the service braking control unit 508, in addition to carrying out the actions related to generating the service braking pressure at the outputs 511, . . . , 514 of the electro-pneumatic service braking unit 507 as a function of the service braking request signal 510 and the weight signal 504

The at least one input signal 520' associated with the additional braking function 550, which is received by the service braking control unit 508, may comprise a main brake pipe pressure signal indicative of the pressure present in said main brake pipe, said signal being generated by a pressure sensor, not shown in the figure, pneumatically connected to said main brake pipe. The service braking control unit 508 continuously observes this main brake pipe pressure signal.

The service braking control unit 508 may be designed to transfer to the outputs 511, ..., 514 of the electro-pneumatic service braking unit 507 the greater of the distributor braking pressure 551 thereby determined, also taking into account the weight signal 504, and the service braking pressure thereby determined as a function of the service braking request signal 510 and the weight signal 504.

The at least one input signal 520 associated with the additional braking function 550, which is received by the emergency braking control unit 503, may comprise a main brake pipe pressure signal indicative of the pressure present in said main brake pipe. The emergency braking control unit 503, in addition to carrying out the actions relating to the generation of the emergency braking pressure 506 described previously, continuously observes the main brake pipe pressure signal indicative of the pressure present in said main brake pipe, said signal being generated by a pressure sensor, not shown in the figures, pneumatically connected to said main brake pipe. If necessary, the main brake pipe pressure signals indicative of the pressure present in said main brake pipe received by the emergency braking control unit 503 and by the service braking control unit 508 coincide and may both be generated by the same sensor.

When the emergency braking control unit 503 determines that the main brake pipe pressure signal has assumed a value indicative of an emergency braking request, i.e. a pressure value below nominal 3.5 bar, it checks that the pressures generated by the service braking control unit 508 on the outputs 511, ..., 514 of the electro-pneumatic service braking unit 507 correspond, within a predetermined tolerance band, to the emergency braking pressure value 506 thereby determined.

If the pressure value read by one or more feedback signals 519 is equal to or greater than the determined distributor pressure value 551, unless said predetermined tolerance band is exceeded, the emergency brake control unit 503 does not perform any action.

If the pressure value read by one or more feedback signals 519 is lower than the determined distributor pressure value 551, within said predetermined tolerance band, the emergency braking control unit 503 commands the opening of the contacts of the interruption device 516 by means of the control signal 517. In this way, the electro-pneumatic service braking unit 507 will propagate the emergency braking pressure value 506 to its outputs 511, ..., 514.

An example of how to raise the safety level of the service braking function is now shown. This function may also be seen as making the emergency braking modulated.

The service braking request signal 510 is also supplied to the emergency braking control unit 503. In practice, the service braking request signal 510 supplied to the emergency braking control unit 503 represents the at least one input signal 520 associated with the additional braking function 550 which is received by the emergency braking control unit 503.

The emergency braking control unit 503, in addition to performing the actions relating to generating the emergency braking pressure 506 described above, continuously observes the received service braking request signal and continuously determines the "safe" service braking value as a function of the service braking request signal received and the weight signal 504.

In the case of the first embodiment described above, the emergency braking control unit 503 sends a command to the service braking control unit 508, via the communication means 518, to apply the "safe" service braking pressure value to the outputs 511, ..., 514 of the electro-pneumatic service braking unit 507.

Subsequently, through the one or more feedback signals 519, it checks that the pressure values at one or more outputs 511, ..., 514 coincide with the previously determined "safe" service pressure value, within a predetermined tolerance band. If the pressure value read by one or more feedback signals 519 does not coincide with the previously determined "safe" service pressure value, within said predetermined tolerance band, the emergency braking control unit 503 commands the contacts of the interruption device 516 to open by means of the control signal 517. In this way, the electro-pneumatic service braking unit 507 will propagate the emergency pressure value 506 to the outputs 511, ..., 514 thereof according to the method previously discussed.

If, on the other hand, the pressure values read through one or more feedback signals 519 indicate that the pressure values at one or more outputs 511, ..., 514 of the electro-pneumatic service braking unit 507 coincide with the "safe" service pressure values previously determined, within a predetermined tolerance band, the emergency pressure control unit 503 does not perform any action.

In the case of the second embodiment described above, the service braking control unit 508 normally carries out the actions relating to generating the service braking pressure at the outputs 511, ..., 514 of the electro-pneumatic service braking unit 507, according to the service braking request signal 510 and the weight signal 504.

The service braking request signal 510 supplied to the service braking control unit 508 represents the at least one input signal 520' associated with the additional braking function 550 which is received by the service braking control unit 508.

At the same time, the emergency braking control unit 503 determines the pressure values relating to "safe" service braking according to the service braking request and the weight signal 504.

Subsequently, the emergency braking control unit 503, through one or more feedback signals 519, checks that the pressure values at one or more outputs 511, ..., 514 of the electro-pneumatic service braking unit 507 coincide with the "safe" service braking pressure value determined by the emergency braking control unit 503, within a predetermined tolerance band.

If the pressure value read by the one or more feedback signals 519 does not coincide with the "safe" service braking pressure value previously determined by the emergency braking control unit 503, within said predetermined tolerance band, the emergency braking control unit 503 commands the contacts of the interruption device 516 to open by means of the control signal 517. In this way, the electro-pneumatic service braking unit 507 will propagate the value of the emergency pressure 506 to the outputs 511, ..., 514 thereof.

If, on the other hand, the pressure values read through the feedback signals 519 coincide within a predetermined tolerance band, with the "safe" service braking values determined by the emergency braking control unit 503, the emergency braking control unit 503 takes no action.

Advantageously, according to the present invention, the emergency braking control unit 503 does not need to perform complex closed-loop pressure checks and related diagnostic algorithms of the electro-pneumatic service unit 507 to generate pressures related to the additional function of which the safety level is to be increased. In the present invention, these functions are left to the service braking control unit 508, according to the state of the art already arranged to carry out the closed-chain controls and related diagnostic algorithms of the electro-pneumatic service unit 507. Advantageously, the emergency braking control unit 503 is limited to simple calculation and subsequent pressure monitoring functions at at least one output 511 ... 514 of the electro-pneumatic service unit 507, with regard to the additional braking functions of which the safety level is to be increased. The braking system 500 of the present invention therefore achieves the increase of the safety level of additional braking functions to the safety level of the emergency braking unit 503 without increasing development costs.

It should be noted that the embodiment proposed for the present invention in the foregoing discussion is purely by way of non-limiting example of the present invention. A person skilled in the art will easily be able to implement the present invention in different embodiments which do not however depart from the principles set forth herein, and are therefore encompassed in the present patent.

This applies in particular to the possibility that the at least one input signal 520 associated with said additional braking function 550, which is received by the emergency braking control unit 503, and the at least one input signal 520' associated with said additional braking function 550, which is received by the service braking control unit 508, may be two distinct signals carrying the same information, or the possibility that the at least one input signal 520 associated with said additional function 550, which is received by the emergency braking control unit 503, and the at least one input signal 520' associated with said additional braking function 550, which is received by the service braking control unit 508, are originally a single signal which is duplicated to reach both the emergency braking control unit 503 and the service braking control unit 508.

Various aspects and embodiments of a braking system for at least one bogie or railway vehicle according to the invention have been described. It is understood that each embodiment may be combined with any other embodiment. Furthermore, the invention is not limited to the described embodiments, but may be varied within the scope defined by the appended claims.

The invention claimed is:

1. A braking system for at least one bogie or railway vehicle comprising an emergency braking control unit made according to a first safety integrity level and a service braking control unit made according to a second safety integrity level lower than said first safety integrity level;
the emergency braking control unit being arranged for:
controlling an electro-pneumatic emergency braking unit by means of a first group of control and feedback signals, so as to generate, through said electro-pneumatic emergency braking unit, an emergency braking pressure of which the pressure value is a function of at least one weight signal indicative of the weight of the bogie or of the railway vehicle to be braked; the electro-pneumatic emergency braking unit being arranged to be supplied by a pneumatic supply pressure;
determining at least one additional pressure value associated with an additional braking function, as a function of at least one input signal associated with said additional braking function and received by the emergency braking control unit;
by means of a communication means, transmitting the at least one additional pressure value associated with the additional braking function to the service braking control unit;
the service braking control unit being arranged for:
determining at least one service braking pressure value as a function of a service braking request signal and of the at least one weight signal;
controlling an electro-pneumatic service braking unit, by means of a second group of control and feedback signals, so as to provide to at least one output of the electro-pneumatic service braking unit the greater of the at least one additional pressure value associated with the additional braking function and the at least one service braking pressure value determined by the service braking control unit (508), the electro-pneumatic service braking unit being arranged to receive at least the emergency braking pressure;
the emergency braking control unit being further arranged for:
receiving at least one feedback signal indicative of the pressure value at the at least one output of the electro-pneumatic service braking unit;
monitoring, by means of the at least one feedback signal, the pressure value at the at least one output of the electro-pneumatic service braking unit;
forcing a pressure value corresponding to the pressure value of the emergency braking pressure at the at least one output of the electro-pneumatic service braking unit, when the additional pressure value associated with the additional braking function is expected at the at least one output of the electro-pneumatic service braking unit, but the pressure value present at the at least one output of the electro-pneumatic service braking unit is lower, by at least a predetermined tolerance value, than the at least one additional pressure value associated with said additional braking function which has been determined by the emergency braking control unit;
the braking system thus realizing at least one additional braking function at the same safety integrity level as the emergency braking control unit.

2. The braking system according to claim 1, wherein the emergency braking control unit is arranged to control an interruption device by means of a control signal;
the emergency braking control unit being arranged to open the interruption device, so as not to allow the connection of the second group of control and feedback signals between the service braking control unit and the electro-pneumatic service braking unit, when the emergency braking control unit must force a pressure value corresponding to the pressure value of the emergency braking pressure at the at least one output of the electro-pneumatic service braking unit;
the electro-pneumatic service braking unit being arranged to propagate the pressure value of the emergency braking pressure to at least one output thereof, when the second group of control and feedback signals are not connected between the service braking control unit and the electro-pneumatic service braking unit.

3. The braking system according to claim 2, wherein when the emergency braking control unit must propagate a pressure value corresponding to the pressure value of the emergency braking pressure to the at least one output of the electro-pneumatic service braking unit, the emergency braking pressure is propagated to the at least one output of the electro-pneumatic service braking unit.

4. The braking system according to claim 1, wherein the electro-pneumatic service braking unit is arranged to receive also the pneumatic supply pressure;

wherein when the emergency braking control unit must propagate a pressure value corresponding to the pressure value of the emergency braking pressure to the at least one output of the electro-pneumatic service braking unit, the pressure value of the pneumatic supply pressure is limited to the value of the emergency braking pressure inside the electro-pneumatic service braking unit and is subsequently propagated to the at least one output of the electro-pneumatic service braking unit.

5. The braking system according to claim 1, wherein the emergency braking control unit is arranged for:
receiving an emergency braking request signal indicative of an emergency braking request;
forcing a pressure value corresponding to the pressure value of the emergency braking pressure to the at least one output of the electro-pneumatic service braking unit, when the emergency braking request signal indicates the need for an emergency braking.

6. A braking system for at least one bogie or railway vehicle comprising an emergency braking control unit made according to a first safety integrity level and a service braking control unit made according to a second safety integrity level lower than said first safety integrity level;
the emergency braking control unit being arranged for:
controlling an electro-pneumatic emergency braking unit, by means of a first group of control and feedback signals, so as to generate, through said electro-pneumatic emergency braking unit, an emergency braking pressure of which the pressure value is a function of at least one weight signal indicative of the weight of the bogie or of the railway vehicle to be braked; the electro-pneumatic emergency braking unit being arranged to be supplied by a pneumatic supply pressure;
determining at least one first additional pressure value associated with an additional braking function, as a function of at least one input signal associated with said additional braking function and received by the emergency braking control unit;
the service braking control unit being arranged for:
determining at least one service braking pressure value as a function of a service braking request signal and the at least one weight signal;
determining at least one second additional pressure value associated with the additional braking function, as a function of the at least one input signal associated with said additional braking function and received by the service braking control unit;
controlling an electro-pneumatic service braking unit, by means of a second group of control and feedback signals, so as to provide to at least one output of the electro-pneumatic service braking unit the greater of the at least one second additional pressure value associated with the additional braking function which was determined by the service braking control unit and the at least one service braking pressure value determined by the service braking control unit; the electro-pneumatic service braking unit being arranged to receive at least the emergency braking pressure;
the emergency braking control unit being also arranged for:
receiving at least one feedback signal indicative of the pressure value at the at least one output of the electro-pneumatic service braking unit;
monitoring, by means of the at least one feedback signal, the pressure value at the at least one output of the electro-pneumatic service braking unit;
forcing a pressure value corresponding to the pressure value of the emergency braking pressure at the at least one output of the electro-pneumatic service braking unit, when the at least one second additional pressure value determined by the service braking control unit is expected at the at least one output of the electro-pneumatic service braking unit' but the pressure value present at the at least one output of the electro-pneumatic service braking unit is lower, by at least a predetermined tolerance value, than the at least one first additional pressure value associated with said additional braking function which has been determined by the emergency braking control unit;
the braking system thus realizing at least one additional braking function at the same safety integrity level as the emergency braking control unit.

7. The braking system according to claim 6, wherein:
the emergency braking control unit is arranged to determine the at least one first additional pressure value associated with the additional braking function by picking from a single- or multi-dimensional matrix indexed with discretized values relative to the at least one input signal associated with said additional function and received by the emergency braking control unit; and/or
the service braking control unit is arranged to determine the at least one second additional pressure value associated with the additional braking function by picking from a single- or multi-dimensional matrix indexed with discretized values relative to the at least one input signal associated with said additional braking function and received by the service braking control unit;
said matrix being previously determined and subsequently loaded into a non-volatile memory of said braking system.

8. A braking system for at least one bogie or railway vehicle comprising an emergency braking control unit made according to a first safety integrity level and a service braking control unit made according to a second safety integrity level lower than said first safety integrity level;
the emergency braking control unit being arranged for:
controlling an electro-pneumatic emergency braking unit, by means of a first group of control and feedback signals, so as to generate an emergency braking pressure, through said electro-pneumatic emergency braking unit, of which the pressure value is dependent on at least one weight signal indicative of the weight of the bogie or of the railway vehicle to be braked; the electro-pneumatic emergency braking unit being arranged to be supplied by a pneumatic supply pressure;
determining at least one first additional pressure value associated with an additional braking function, as a function of at least one input signal associated with said additional braking function and received by the emergency braking control unit;
the service braking control unit being arranged for:
determining at least one service braking pressure value as a function of a service braking request signal and the at least one weight signal;
determining at least one second additional pressure value associated with the additional braking function, as a function of the at least one input signal associated with said additional braking function and received by the service braking control unit;

controlling an electro-pneumatic service braking unit, by means of a second group of control and feedback signals, so as to provide to at least one output of the electro-pneumatic service braking unit the greater of the at least one second additional pressure value associated with the additional braking function, which has been determined by the service braking control unit, and the at least one service braking pressure value determined by the service braking control unit; the electro-pneumatic service braking unit being arranged to receive at least the pneumatic supply pressure;

the braking system for at least one bogie or railway vehicle comprising an electro-pneumatic selection unit including at least one pressure output;

the electro-pneumatic selection unit being arranged for:
receiving at least the emergency braking pressure, the at least one pressure at the at least one output of the electro-pneumatic service braking unit and a control signal coming from the emergency braking control unit;
propagating to its at least one pressure output the emergency braking pressure or the at least one pressure present at the at least one output of the electro-pneumatic service braking unit, as a function of the control signal coming from the emergency braking control unit;

the emergency braking control unit being also arranged for:
receiving at least one feedback signal indicative of the pressure value at the at least one pressure output of the electro-pneumatic selection unit;
monitoring, by means of the at least one feedback signal, the pressure value at the at least one pressure output of the electro-pneumatic selection unit;
controlling the electro-pneumatic selection unit through the control signal so as to activate the propagation of the pressure value of the emergency braking pressure value to the at least one pressure output of said electro-pneumatic selection unit when the at least one second additional pressure value associated with said additional braking function determined by the service braking control unit is expected at the at least one pressure output of the electro-pneumatic selection unit', but the pressure value present at the at least one pressure output of the electro-pneumatic selection unit is lower, by at least a predetermined tolerance value, than the at least one additional first pressure value associated with said additional braking function which has been determined by the emergency braking control unit;

the braking system thus realizing at least one additional braking function at the same level of safety integrity as the emergency braking control unit.

9. The braking system according to claim 8,
wherein the emergency braking control unit is arranged for:
receiving an emergency braking request signal indicative of an emergency braking request;
controlling the electro-pneumatic selection unit through the control signal so as to activate the propagation of the emergency braking pressure to the at least one pressure output, when the emergency braking request signal indicates the need for emergency braking.

10. The braking system according to claim 8, wherein the additional braking function is a holding brake function, and the at least one input signal associated with said additional braking function comprises:
at least one speed signal indicative of the speed of at least one axle of the bogie or railway vehicle, or directly indicative of a travel speed of said bogie or railway vehicle; and
at least one available traction torque signal indicative of the currently present traction torque.

11. The braking system according to claim 8, wherein the additional braking function is a Distributor Emulation function, and the at least one input signal associated with said additional braking function comprises a signal indicative of a main brake pipe pressure of the bogie or vehicle railway.

12. The braking system according to claim 8, wherein the additional braking function is a modulated emergency braking function or a high safety level service braking function, and the at least one input signal associated with said additional braking function comprises a service braking request signal.

13. A braking system for at least one bogie or railway vehicle comprising an emergency braking control unit made according to a first safety integrity level and a service braking control unit made according to a second safety integrity level lower than said first safety integrity level;
the emergency braking control unit being arranged for:
controlling an electro-pneumatic emergency braking unit by means of a first group of control and feedback signals, so as to generate an emergency braking pressure, through said electro-pneumatic emergency braking unit, of which the pressure value is a function of at least one weight signal indicative of the weight of the bogie or of the railway vehicle to be braked; the electro-pneumatic emergency braking unit being arranged to be supplied by a pneumatic supply pressure;
determining at least one additional pressure value associated with an additional braking function, as a function of at least one input signal associated with said additional braking function and received by the emergency braking control unit;
by a communication means, transmitting the at least one additional pressure value associated with the additional braking function to the service braking control unit;

the service braking control unit being arranged for:
determining at least one service braking pressure value according to a service braking request signal and at least one weight signal;
controlling an electro-pneumatic service braking unit, by means of a second group of control and feedback signals, so as to provide to the at least one output of the electro-pneumatic service braking unit the greater of the at least one additional pressure value associated with the additional braking function which has been determined by the emergency braking control unit and the at least one service braking pressure determined by the service braking control unit; the electro-pneumatic service braking unit being arranged to receive at least the pneumatic supply pressure;

the braking system for at least one bogie or railway vehicle comprising an electro-pneumatic selection unit including at least one pressure output;
the electro-pneumatic selection unit being arranged for:

receiving at least the emergency braking pressure, the at least one pressure present at the at least one output of the electro-pneumatic service braking unit and a control signal coming from the emergency braking control unit;

propagating to at least one pressure output thereof the emergency braking pressure or the at least one pressure present at the at least one output of the electro-pneumatic service braking unit, as a function of the control signal coming from the emergency braking control unit;

the emergency braking control unit being further arranged for:

receiving at least one feedback signal indicating the pressure value present at the at least one pressure outlet of the electro-pneumatic selection unit;

monitoring, by means of the at least one feedback signal, the pressure value present at the at least one pressure output of the electro-pneumatic selection unit;

controlling the electro-pneumatic selection unit through the control signal so as to activate the propagation of the pressure value of the emergency braking pressure to the at least one pressure output of said electro-pneumatic selection unit when the at least one additional pressure value associated with said additional braking function is expected at the at least one pressure output of the electro-pneumatic selection unit, but the pressure value present at the at least one pressure output of the electro-pneumatic selection unit is lower, by at least one predetermined tolerance value, than the at least one additional pressure value associated with said additional braking function which has been determined by the emergency braking control unit;

the braking system thus realizing at least one additional braking function at the same safety integrity level as the emergency braking control unit.

\* \* \* \* \*